United States Patent
Spencer

(10) Patent No.: US 9,851,794 B2
(45) Date of Patent: *Dec. 26, 2017

(54) BULK RESISTIVE GLOVE

(71) Applicant: PROLIFIC INNOVATIONS, LLC, New York, NY (US)

(72) Inventor: Jennifer Spencer, Fort Collins, CO (US)

(73) Assignee: PROLIFIC INNOVATIONS LLC, New York, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/082,557

(22) Filed: Mar. 28, 2016

(65) Prior Publication Data

US 2016/0209921 A1    Jul. 21, 2016

Related U.S. Application Data

(63) Continuation of application No. 14/097,233, filed on Dec. 4, 2013, now Pat. No. 9,298,326, which is a
(Continued)

(51) Int. Cl.
*G06F 3/041*     (2006.01)
*G06F 3/01*      (2006.01)
(Continued)

(52) U.S. Cl.
CPC .............. *G06F 3/014* (2013.01); *D02G 3/441* (2013.01); *D03D 1/0088* (2013.01); *D04B 1/28* (2013.01);
(Continued)

(58) Field of Classification Search
CPC .......... G06F 3/014; G06F 3/033; G06F 3/041; G06F 3/044; D02G 3/441; D02G 3/449; D03D 1/0088; D04B 1/28; A41D 19/00
See application file for complete search history.

(56) References Cited

U.S. PATENT DOCUMENTS 4,470,251 A * 9/1984 Bettcher .......... A41D 19/01511
                                                 2/16
4,684,762 A * 8/1987 Gladfelter .............. D03D 15/00
                                                139/425 R
(Continued)

FOREIGN PATENT DOCUMENTS

CN    201577082 U  *  9/2010
CN    201663077 U  * 12/2010
(Continued)

*Primary Examiner* — Joe H Cheng
(74) *Attorney, Agent, or Firm* — Polsinelli PC

(57) ABSTRACT

Gloves are disclosed that are worn by a user while manipulating an electronic device equipped with a capacitive touchscreen. The gloves allow the wearer to manipulate the capacitive touchscreen device without removing the gloves, which is very advantageous in cold environments. The gloves enable full hand functionality, allowing the user to type, swipe, squeeze, pinch, and select on the capacitive touchscreen device as if they were using their bare hand. The gloves are made with a low resistant yarn knit or woven into a comfortable fabric that connects the body's bioelectricity through the glove to a capacitive touchscreen. Ordinary gloves will not work with a capacitive touchscreen. In the manufacturing process, the low resistant yarn is first twisted around at least one other yarn having a specific performance property, such as thermal resistance. This twisting assists in uniform knitting and improves the consistent resistivity of the finished glove.

17 Claims, 3 Drawing Sheets

Related U.S. Application Data continuation of application No. 13/247,918, filed on Sep. 28, 2011, now Pat. No. 8,605,049.

(51) Int. Cl.
| | |
|---|---|
| *G06F 3/039* | (2013.01) |
| *D02G 3/44* | (2006.01) |
| *G06F 3/044* | (2006.01) |
| *D03D 1/00* | (2006.01) |
| *D04B 1/28* | (2006.01) |
| *A41D 19/00* | (2006.01) |

(52) U.S. Cl.
CPC .............. *G06F 3/039* (2013.01); *G06F 3/044* (2013.01); *A41D 19/0024* (2013.01)

(56) References Cited

U.S. PATENT DOCUMENTS

| | | | | |
|---|---|---|---|---|
| 5,070,540 A | * | 12/1991 | Bettcher | A41D 19/0058 156/165 |
| 5,248,548 A | * | 9/1993 | Toon | A41D 19/01511 2/167 |
| 5,442,815 A | * | 8/1995 | Cordova | A61B 42/10 2/161.7 |
| 5,906,004 A | * | 5/1999 | Lebby | A41D 31/00 139/425 R |
| 6,141,643 A | * | 10/2000 | Harmon | G10L 21/06 235/462.44 |
| 6,488,564 B1 | * | 12/2002 | Gray | A41C 3/00 450/1 |
| 7,874,021 B2 | * | 1/2011 | Sunder | A41D 19/01547 2/16 |
| 8,001,999 B2 | * | 8/2011 | Schultz | A41D 31/0066 139/383 R |
| 8,400,256 B2 | * | 3/2013 | Matthews | A41D 19/0024 2/164 |
| 8,605,049 B2 | * | 12/2013 | Spencer | G06F 3/039 345/173 |
| 9,298,326 B2 | * | 3/2016 | Spencer | G06F 3/039 |
| 2001/0022096 A1 | * | 9/2001 | Orima | D02G 3/12 66/170 |
| 2004/0121684 A1 | * | 6/2004 | Haun | A47C 7/32 442/209 |
| 2005/0204470 A1 | * | 9/2005 | Main | A61G 7/1023 5/81.1 T |
| 2005/0214501 A1 | * | 9/2005 | Baychar | A41D 31/02 428/90 |
| 2005/0282009 A1 | * | 12/2005 | Nusko | D02G 3/12 428/375 |
| 2007/0243783 A1 | * | 10/2007 | Kotani | A41D 19/00 442/306 |
| 2007/0245454 A1 | * | 10/2007 | Eklund | G06F 3/014 2/161.6 |
| 2008/0098501 A1 | * | 5/2008 | Takata | A41D 19/01511 2/161.8 |
| 2008/0181969 A1 | * | 7/2008 | Blanton | C08K 3/005 424/618 |
| 2009/0291147 A1 | * | 11/2009 | Sandford | A01N 59/16 424/618 |
| 2010/0090966 A1 | * | 4/2010 | Gregorio | A41D 19/0024 345/173 |
| 2010/0093851 A1 | * | 4/2010 | Blanton | C08K 3/005 514/495 |
| 2010/0160486 A1 | * | 6/2010 | Blanton | A01N 59/16 523/122 |
| 2010/0186144 A1 | * | 7/2010 | Zhu | A41D 19/01511 2/167 |
| 2010/0186455 A1 | * | 7/2010 | Zhu | A41D 19/01505 66/174 |
| 2010/0186456 A1 | * | 7/2010 | Zhu | A41D 19/01511 66/174 |
| 2010/0186457 A1 | * | 7/2010 | Zhu | A41D 19/01505 66/174 |
| 2011/0023206 A1 | * | 2/2011 | Dunn | A41D 31/0022 2/81 |
| 2011/0047672 A1 | * | 3/2011 | Hatfield | A41D 19/0024 2/163 |
| 2012/0128995 A1 | * | 5/2012 | Leto | C09D 175/04 428/473 |
| 2013/0027362 A1 | * | 1/2013 | Lee | A41D 13/087 345/179 |
| 2013/0168222 A1 | * | 7/2013 | Ning | H01H 9/0264 200/600 |

FOREIGN PATENT DOCUMENTS

| | | | | |
|---|---|---|---|---|
| CN | 201758810 U | * | 3/2011 | |
| CN | 201767105 U | * | 3/2011 | |
| CN | 201821980 U | * | 5/2011 | |
| FR | 2939608 A1 | * | 6/2010 | ............ G06F 3/014 |
| JP | 2008-81896 A | * | 4/2008 | |
| JP | 2001-3168219 | * | 6/2011 | |
| JP | 2001-149299 | * | 5/2013 | |
| WO | WO 2005/102088 A1 | * | 11/2005 | |
| WO | WO 2010/130632 A1 | * | 11/2010 | |
| WO | WO 2010/141743 A1 | * | 12/2010 | |

* cited by examiner

BULK RESISTIVE GLOVE

CROSS-REFERENCE TO RELATED APPLICATIONS

This application is a continuation of U.S. patent application Ser. No. 14/097,233, titled "BULK RESISTIVE GLOVE", filed on Dec. 4, 2013, now issued as U.S. Pat. No. 9,298,326 B2, which is a continuation of U.S. patent application Ser. No. 13/247,918 titled "BULK RESISTIVE GLOVE", filed on Sep. 28, 2011, now issued as U.S. Pat. No. 8,605,049 B2, both of which are incorporated herein by reference in their entireties for all that is taught and disclosed therein.

BACKGROUND

Technical Field

This invention relates to bulk resistive gloves that are able to connect the body's bioelectricity to touchscreen displays. Bioelectricity refers to the capacitive stored electrical charge occurring within or produced by living organisms such as humans. The connectivity of this stored electrical charge to the touchscreen is affected by moisture, both environmental and sweat, and salts on the surface of the skin. Ordinary highly resistive (low or non-conductive) gloves block the body's bioelectricity from flowing from the skin through the gloves to the outer surface of the gloves. Electrical resistivity (also known as resistivity, specific electrical resistance, or volume resistivity) is a measure of how strongly a material opposes the flow of electric current. A low resistivity indicates a material that readily allows the movement of electric charge.

There are several different types of touchscreen displays, two of which are capacitive touchscreens and resistive touchscreens. Resistive touchscreens respond to pressure applied to the surface of the display. As such, resistive type touchscreens require a sufficient amount of pressure in order to activate the touchscreens. Capacitive touchscreens rely on human bioelectricity to detect when and where on the touchscreen the user is touching. Tiny amounts of moisture, salts, and oils on the skin of the fingers assist connectivity of the bioelectricity to the touchscreen device by allowing a current to flow between the fingers and the capacitive touchscreen device. Because of this, capacitive touchscreens can be manipulated with very light touches of a finger and generally cannot be used with a mechanical stylus or a gloved hand. As a result, in a cold environment, typical gloves worn by a user of a capacitive touchscreen device must be removed in order to use the device, as the gloved fingers do not make an electrical connection with the capacitive touchscreen possible.

Multi-touch capacitive touchscreens recognize and interpret more than one touch at a time. Multi-touch capacitive touchscreens recognize both commands (single touch) and multi-touch gestures (size, shape and location of the affected area on the screen). This allows the device to determine the location and movement of simultaneous touches in multiple locations.

Raynaud's phenomenon is a condition that causes some areas of the body—such as the fingers, toes, tip of the nose and ears—to feel numb and cool in response to cold temperatures or stress. In Raynaud's disease, smaller arteries that supply blood to the skin narrow, limiting blood circulation to affected areas. Women are more likely than men to have Raynaud's disease. It is also more common in people who live in colder climates. For most people, Raynaud's disease is more a nuisance than a disability. One of the nuisances is the inability of some Raynaud's disease sufferers for their finger touch to be detected by capacitive touchscreen devices.

SUMMARY

This Summary is provided to introduce in a simplified form a selection of concepts that are further described below in the Detailed Description. This Summary is not intended to identify key features or essential features of the claimed subject matter, nor is it intended to be used to limit the scope of the claimed subject matter.

When an individual touches a capacitive touchscreen with their bare finger, they are completing a circuit by supplying an electrical charge from their body to the screen. When there is a large enough electrical barrier, the charge is not transferred. Electrical barriers can be regular gloves, thick polymer gloves, dry skin, skin with certain conditions, cold weather, low humidity, etc. Bulk Resistive Gloves allow the charge to move from the body to the device and aid in overcoming several barriers by increasing the connection between the device and the body. The Detailed Description below describes bulk resistive gloves. One application for bulk resistive gloves is winter gloves worn by a user while manipulating an electronic device equipped with a capacitive touchscreen. The bulk resistive gloves described below allow the wearer to manipulate their capacitive touchscreen device while keeping their gloves on. Ordinary gloves require the user to remove the gloves in order to operate the capacitive touchscreen device. There are a wide variety of capacitive touchscreen devices that include, but are not limited to, iPhones, Tablets, Droids, iPads, iPods, eReaders, GPS systems, other Smartphones and tablets, portable video game consoles, cameras, and other capacitive touchscreen devices, such as self-checkout displays in a retail store, or self-check-in kiosks at an airport. The bulk resistive gloves described below enable users to operate multi-touch capacitive touchscreen devices while wearing gloves as they would with their bare hand. This includes gestures such as type, swipe, squeeze, pinch, and select on the capacitive touchscreen device.

Another application of bulk resistive gloves is as an aid to individuals with low electrodermal response. Individuals with low electrodermal response may experience difficulty operating capacitive touchscreen devices. Low electrodermal response may be due to many causes, including the following conditions or factors: dryness, circulation, cold, low humidity, disease, genetic conditions, etc., as well as other non-enumerated conditions or factors. Wearing the bulk resistive gloves described below enables the wearer with low electrodermal response to successfully manipulate capacitive touchscreen devices.

Another application of bulk resistive gloves is as an aid to individuals with a prosthetic hand or hands. Wearing the bulk resistive glove(s) with extended sleeves described below enables the wearer with a prosthetic hand(s) to successfully manipulate capacitive touchscreen devices. There are other applications for bulk resistive gloves that will lend themselves to one skilled in the art that are not further enumerated herein.

DETAILED DESCRIPTION

Figure 1:
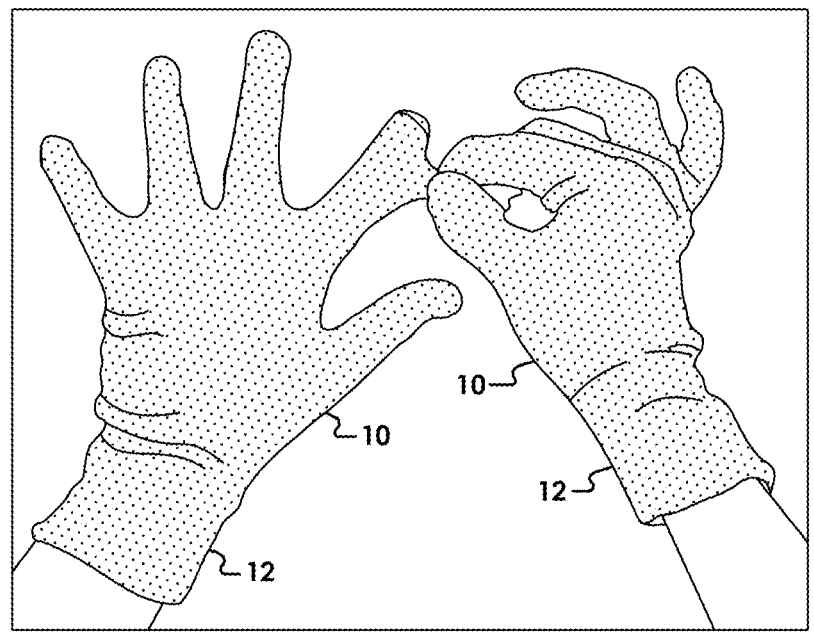
FIG. 1 shows an embodiment of bulk resistive gloves worn by a user in a cold environment.

Referring now to the Figures, like reference numerals and names refer to structurally and/or functionally similar elements thereof, and objects depicted in the figures that are covered by another object, as well as the tag line for the element number thereto, may be shown in dashed lines. FIG. 1 shows an embodiment of bulk resistive gloves worn by a user in a cold environment. Referring now to FIG. 1, Bulk Resistive Gloves 10 are made in one embodiment of 60% polyester, 29% nylon, 7% silver nylon, 3% spandex, and 1% acrylic. In this embodiment, silver has been identified as a useful material due to its low resistance. Bulk Resistive Gloves 10 gain consistent resistivity throughout the glove in part through a technique that intertwines silver nylon knitted or woven throughout the bulk of the entire glove—including the fingers, the palm-of-the-hand side, the back-of-the-hand side, and inside the glove and cuff 12. One skilled in the art will recognize that other low resistance materials other than silver may be used as a design choice.

Spandex, an elastomeric yarn, is also a useful material and is knit or woven throughout the entire bulk of the glove so that Bulk Resistive Gloves 10 fit snugly against the skin of the wearer. Glove compression greatly enhances the points of contact with the skin of the wearer. In addition, a snug fit provides a tactile responsiveness advantageous for wearers to complete gestures on multi-touch capacitive touchscreen devices. One skilled in the art will recognize that other materials besides elastomeric yarns may also be used to generate the desired compression or snugness of fit for Bulk Resistive Gloves 10. Bulk Resistive Gloves 10 are lightweight, soft, stretchy gloves. The combination of consistent resistivity throughout the entire glove and snug fit allows wearers of Bulk Resistive Gloves 10 to experience full functionality with capacitive touchscreen devices as if they were using these devices with their bare hands.

Different ratios of these components may be made as a design choice to achieve desired end product characteristics. The percentages shown above have proven to be very suitable to provide accuracy and precision when using capacitive touchscreen devices in cold environments. Winter weather is one example of a cold environment. Refrigerated storage areas and air-conditioned equipment rooms are other examples of cold environments.

In another embodiment, Bulk Resistive Gloves 10 may be made of 75% acrylic, 15% silver nylon, 3% spandex, and 5% rubber thread, which produces a warmer glove for added comfort in still colder environments and yet still mimics bare hand operation of capacitive touchscreen devices. The rubber thread is typically only used in Cuff 12 of Bulk Resistive Gloves 10 in a secondary manufacturing process. Bulk Resistive Gloves 10 allow the user to text, browse, call, or type on the capacitive touchscreen device without loss of performance and without having to remove the gloves, so the user's hands stay warm in cold environments.

In one embodiment, Bulk Resistive Gloves 10 are made with silver. Silver is a known antimicrobial material. Wearing gloves, including Bulk Resistive Gloves 10, creates a barrier between the user and public dirt and germs. Because the wearer does not need to remove Bulk Resistive Gloves 10 to operate capacitive touchscreen devices, the user's hands may stay cleaner. Capacitive touchscreen devices can be private, such as a Smartphone, or public, such as ticket kiosks, self-checkout displays in a retail store, or self-check-in kiosks at an airport.

Figure 2:
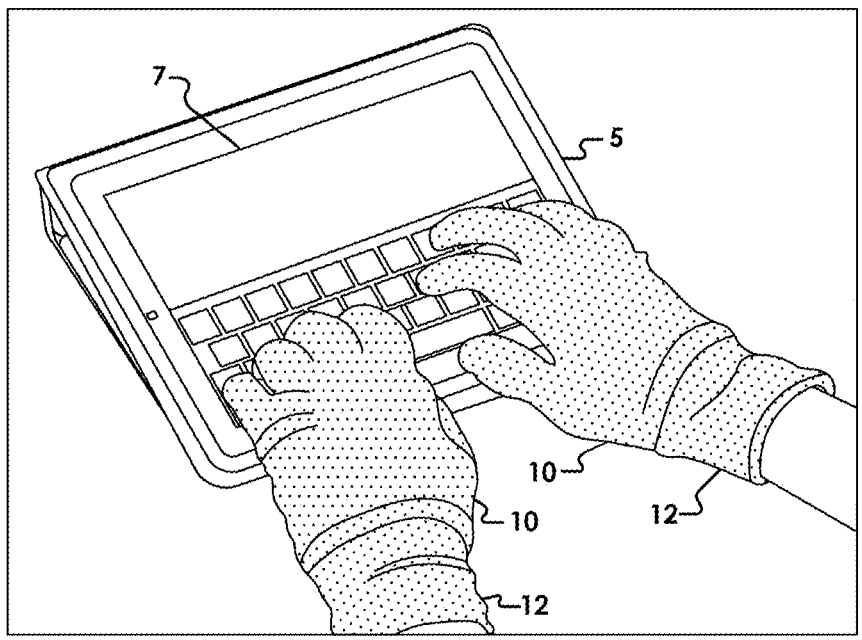
FIG. 2 shows an embodiment of bulk resistive gloves worn by a user to operate a capacitive touchscreen tablet device in a cold environment.

FIG. 2 shows an embodiment of bulk resistive gloves worn by a user to operate a capacitive touchscreen Tablet Device 5 in a cold environment. Referring now to FIG. 2, the Capacitive Touchscreen 7 of Tablet Device 5 is responsive to all ten fingers of Bulk Resistive Gloves 10, which capitalizes on the capacitive nature of the human body to interact electrically with Capacitive Touchscreen 7 of Tablet Device 5. The user wearing Bulk Resistive Gloves 10 can operate Tablet Device 5 as they would with their bare hands, using the same multi-finger gestures and touch commands. The wearer can use any surface of Bulk Resistive Gloves 10, including the first, second, or third knuckle of any finger, or the thumb, the sides or back of the fingers or thumb, or the palm or back of the hand to manipulate the capacitive touchscreen.

Figure 3:
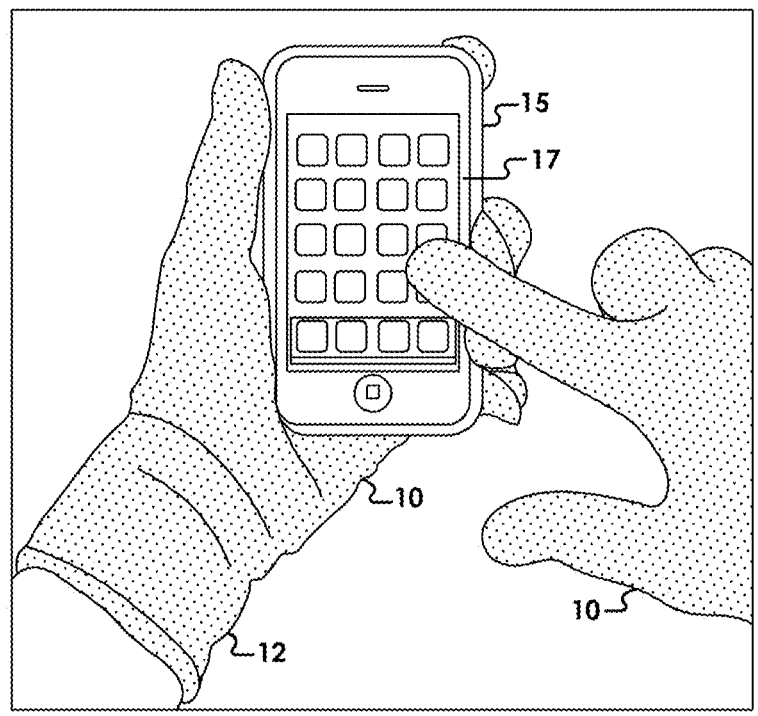
FIG. 3 shows an embodiment of bulk resistive gloves worn by a user to operate a capacitive touchscreen Smartphone in a cold environment.

FIG. 3 shows an embodiment of bulk resistive gloves worn by a user to operate a capacitive touchscreen Smartphone in a cold environment. Referring now to FIG. 3, Bulk Resistive Gloves 10 are worn by a user operating Smartphone 15. The Capacitive Touchscreen 17 of Smartphone 15 is responsive to all the portions of Bulk Resistive Gloves 10, which increases the connectivity between the user's hand and Capacitive Touchscreen 17.

Figure 4:
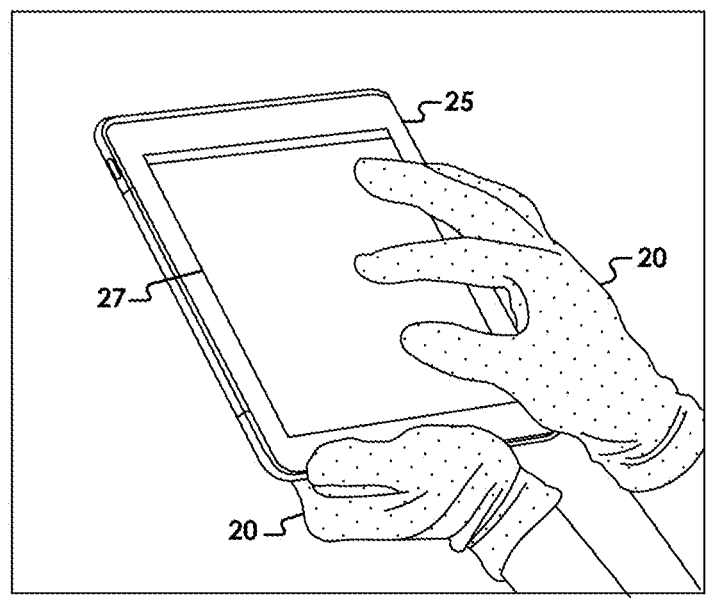
FIG. 4 shows an embodiment of bulk resistive gloves worn by a user to operate a capacitive touchscreen tablet device in a cold or warm environment.

FIG. 4 shows an embodiment of bulk resistive gloves worn by a user to operate a capacitive touchscreen tablet device in a cold or warm environment. Referring now to FIG. 4, Bulk Resistive Gloves 20 in one embodiment are made of 70% bamboo, 15% silver nylon, 11% spandex, and 4% rubber thread. Different ratios of these components may be made as a design choice to achieve desired end product characteristics. The percentages shown above have proven to be very suitable for warm or cold environments. Bulk Resistive Gloves 20 are lightweight and create a barrier between the user and public dirt and germs. The user's hands stay cleaner and yet able to manipulate publicly available capacitive touchscreen devices. Capacitive Touchscreen 27 of Tablet Device 25 is responsive to all portions of Bulk Resistive Gloves 20, which increases the connectivity between the small electric current from the user's hand to Capacitive Touchscreen 27.

Bulk Resistive Gloves 10 and 20 are also useful for persons suffering from mysophobia (abnormal fear of or distaste for uncleanliness or contamination). Such persons can wear Bulk Resistive Gloves 10 or 20 to operate public capacitive touchscreen devices, such as ticket kiosks, self-checkout displays in retail stores, or self-check-in kiosks at airports, where hundreds of people each and every day are touching these publicly available capacitive touchscreens. Such public devices have many germs on their touchscreens.

Bulk Resistive Gloves 10 and 20 can improve the electrodermal response of fingertips to capacitive touchscreen devices for individuals with low electrodermal response. Wearing Bulk Resistive Gloves 10 or 20 enables the wearer with dry skin or in cold, low humidity environments to successfully manipulate capacitive touchscreen devices. One example of this is individuals with Raynaud's phenomenon. For most people, Raynaud's phenomenon is more a nuisance than a disability. One of the nuisances is the inability of some Raynaud's phenomenon sufferers to be recognized by capacitive touchscreen devices because of the low electrodermal response in their fingers. For these and other individuals, the volume resistivity provided by Bulk Resistive Gloves 10 or 20 (versus conductive points located solely on the fingertips prevalent in other glove designs) transfers bioelectricity from more electrodermally responsive parts of the hand, such as the palm and back of the hand and wrist to the fingertips, to enable effective use of capacitive touchscreen devices.

Figure 5:
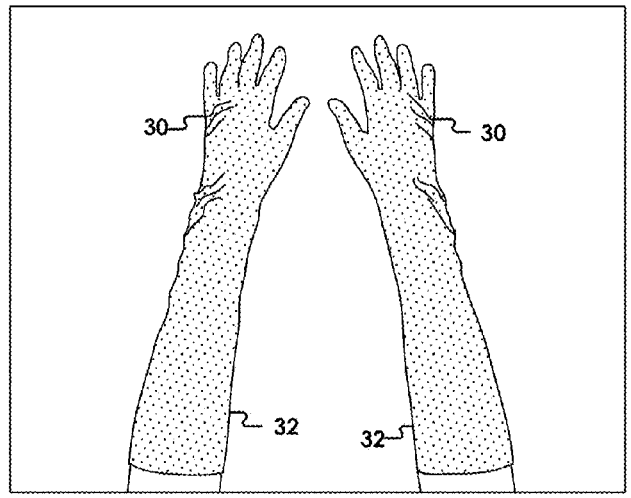
FIG. 5 shows an embodiment of bulk resistive gloves worn by a user having a prosthetic hand to operate a capacitive touchscreen device.

FIG. 5 shows an embodiment of bulk resistive gloves worn by a user having a prosthetic hand to operate a capacitive touchscreen device. Referring now to FIG. 5, an individual having a mechanical or prosthetic hand cannot operate a capacitive touchscreen device because they have no skin on their fingers or hand to electrically interact with the capacitive touchscreen. Bulk Resistive Gloves 30 can be made larger to increase the connection to the body at the wrist, forearm, or even shoulder. In one embodiment, Bulk Resistive Gloves 30 have Sleeves 32 that extend up to the elbow. Bulk Resistive Gloves 30 may have the material compositions as discussed above in reference to Bulk Resistive Gloves 10 or 20. As such, the silver-coated nylon is knitted or woven throughout the entire bulk of the glove including Sleeves 32, thus providing the skin contact with Bulk Resistive Gloves 30 to capitalize on the capacitive nature of the human body to interact electrically with capacitive touchscreen devices. Capacitive touchscreens are now responsive to the mechanical or prosthetic hand and fingers inside of Bulk Resistive Gloves 30. For an individual having a prosthetic or mechanical hand and forearm, Sleeves 32 can be extended up the upper arm and even to the shoulder to provide the skin contact with the consistent resistivity of the knit or woven fabric of Bulk Resistive Gloves 30. In this application, only one Bulk Resistive Glove 30 may need to be worn if the wearer has only one prosthetic or mechanical hand. Indeed, in all of the applications discussed above, only one Bulk Resistive Glove 10/20/30 may be worn by the user as the situation or circumstance requires.

Figure 6:
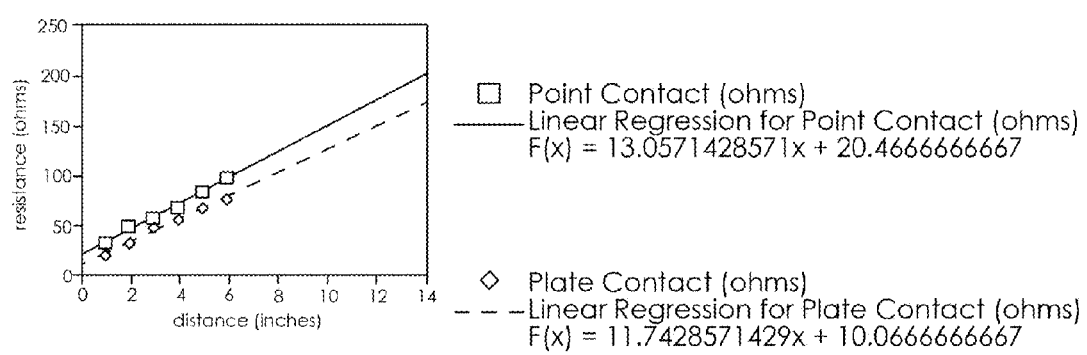
FIG. 6 shows a graph of measurements regarding the volume resistance of the bulk resistive gloves in an embodiment.

FIG. 6 shows a graph of measurements regarding the volume resistance in an embodiment of the bulk resistive gloves. Referring now to FIG. 6, measurements regarding the volume resistance of Bulk Resistive Gloves 10 of FIGS. 1-3 are shown. Low resistance yarns are usually measured in terms of linear resistance at twelve inches. Since the Bulk Resistive Gloves 10 of FIGS. 1-3 are not twelve inches long, measurements in one-inch increments were made and then extrapolated to twelve inches. While it is possible to perform a measurement of resistance on the individual component of silver nylon used in Bulk Resistive Gloves 10/20/30, it has been determined that how the fabric is constructed plays a substantial role in the proper functioning of Bulk Resistive Gloves 10/20/30. Thus, a more important and meaningful measurement is the volume resistivity of the entire knitted or woven fabric in the glove. The full volume of the Bulk Resistive Glove works as a unit to provide a bridge between the body's capacitance and the device. In the Bulk Resistive Gloves, the connection is uniform across the entire glove for two purposes. Purpose one is to allow the connection to the touchscreen to happen anywhere on the glove, and purpose two is to allow the connection from anywhere on the glove to the body. The glove is acting as an electrical bridge between the body and the device.

Electrical resistivity is greatly influenced by the nature of the fabric structure and the amount of silver nylon in the fabric. In only measuring the silver nylon component, a much lower resistance would be obtained. However, this does not translate directly to the resistance of the finished fabric. The volume resistivity of the finished fabric has greater implication in the proper functioning of Bulk Resistive Gloves 10/20/30.

The volume resistance of the finished fabric was measured using two different methods. Method one utilizes a point contact, and method two utilizes a plate contact. The point contact method utilizes two pointed electrode probes that touch the finished fabric at points one inch apart, two inches apart, etc., and resistance readings taken at each distance. The plate contact measurement utilizes two metal plates for the electrode probes, which increases the connectivity of the probes to the finished fabric. The plates are parallel to each other and positioned one inch apart, two inches apart, etc., and resistance readings taken at each distance. When measuring the finished fabric, the silver nylon yarn strands intertwine with each other and run from the inside to the outside of the finished fabric. Thus, the points of connection with the human skin are exponentially increased. Table 1 below shows the measurement results.

TABLE 1

| Distance Between Probes (Inches) | Point Contact Method Measured Resistivity (Ohms) | Plate Contact Method Measured Resistivity (Ohms) |
| --- | --- | --- |
| 1 | 33 | 20 |
| 2 | 50 | 33 |
| 3 | 58 | 49 |
| 4 | 69 | 57 |
| 5 | 87 | 69 |
| 6 | 100 | 79 |
| — | — | — |
| 12 (Linear Extrapolation) | 176 | 150 |

The resistance measurements were performed at 40% relative humidity. Relative humidity impacts resistance. High relative humidity lowers resistance, and low relative humidity increases resistance. This is important because the capacitive nature of human skin can be affected by moisture, both environmental and sweat, and salts on the surface of the skin.

Extrapolated results using linear regression from these measurements show that the Bulk Resistive Gloves 10 tested have about 150 to 175 ohms per foot resistance. This resistance is much greater than gloves with conductive material located only in the fingertips.

Figure 7:
FIG. 7 shows a low resistance yarn wrapped around a core yarn having a specific performance property in an embodiment.

FIG. 7 shows a low resistance yarn wrapped around a core yarn having a specific performance property in an embodiment. Referring now to FIG. 7, in one embodiment of the invention, the silver nylon utilized is sold under the brand name X-Silver and is a fine silver-coated yarn suitable for knitting. Other suitable silver nylon yarn such as silver polyester, silver polypropylene, or silver polyurethane may be used as a design choice. In the manufacturing process, the Silver Nylon Yarn 38 is first twisted around at least one Other Yarn 40 having a specific performance property, such as the acrylic yarn used in Bulk Resistive Gloves 10, or such as the bamboo yarn used in Bulk Resistive Gloves 20, and then spooled. Thus, a Twisted or Core-And-Sheath-Like Yarn 42 is produced.

The specific performance property of Other Yarn 40 allows for gloves to be designed for specific environments where interaction with capacitive touchscreens is required or desirable. For example, Other Yarn 40 may be NOMEX® or KEVLAR® to produce a fire resistant glove for use in the aviation industry or in other environments where fire protection of the hands is needed. Other Yarn 40 may be COOLMAX® or COCONA® polyester which wick moisture away from the skin. In environments where bacterial protection is needed, Other Yarn 40 may be X-STATIC® yarn or other antimicrobial material. In environments where UV light protection is needed, Other Yarn 40 may be CUPRON® yarn or other similar material. Gloves utilizing any of these specific performance properties in combination with Silver Nylon Yarn 38 or other suitable low resistance yarns, such as silver polyester, silver polypropylene, or silver polyurethane, enable the functionality of the gloves with capacitive touchscreen devices.

Silver Nylon Yarn 38 may be twisted around the outside of one, two or more Other Yarns 40. This twisting assists in achieving more uniform knitting and improves the consistent resistivity of the finished fabric. It was found that without twisting, dead spots in the gloves could be found in the finished fabric, reducing its effectiveness. Since Silver Nylon Yarn 38 is very thin and breaks easily, twisting it around at least one other core Other Yarn 40, which is typically thicker and stronger, also makes the knitting process easier. One or more spools of spandex, Twisted or Core-And-Sheath-Like Yarn 42 and spools of any other materials utilized, are pulled into the knitting machine to knit the gloves as one skilled in the art is familiar with and will not be further described herein. One skilled in the art could also use other types of combined yarns to achieve the same desired effect, such as, a yarn spun with a combination of a low resistance fibers (silver, copper, gold, carbon, etc.) with other high resistance fibers having specific performance properties, or twisting low resistive filament yarns with other high resistant filament yarns having specific performance properties.

One skilled in the art will also recognize that different types of knitting can achieve the desired compression or snugness of fit of Bulk Resistive Gloves 10. For example, Twisted or Core-And-Sheath-Like Yarn 42 by itself can be knit in a ribbed or other intertwining pattern, creating a compression function. Such an embodiment may require a wider variety of sizes in order to achieve the desired compression or snugness of fit for Bulk Resistive Gloves 10 since no elastomeric yarn is used.

The finished fabric volume resistance is more important than the silver nylon resistance alone. The desired finished fabric resistance is achieved by twisting the silver nylon on the outside of at least one other yarn. Using the twisted core-and-sheath-like yarn throughout the entire glove enhances connectivity to the skin of the user. Thus to achieve optimum performance the Bulk Resistive Gloves 10/20/30 have a combination of:

(1) A twisted core-and-sheath-like yarn made of a low resistance yarn (e.g., silver nylon yarn) twisted around one or more other yarns with specific performance properties, such as: thermal resistance (e.g., acrylic or wool), moisture management (e.g., COOLMAX® or COCONA® yarn), bacterial protection (e.g., X-STATIC® yarn), UV light protection (e.g., COCONA® yarn), virus protection (e.g., CUPRON® yarn), and/or fire resistance (e.g., NOMEX® or KEVLAR®).

(2) This twisted core-and-sheath-like yarn is used throughout the entire bulk of the glove to enhance the connection points to the skin of the user to capitalize on the capacitive nature of the human body.

(3) The twisted core-and-sheath-like yarn intertwines itself and runs from the inside to the outside of the finished fabric and thus the likelihood of connections with the skin is increased.

(4) The spandex used throughout the entire bulk of the glove also enhances the connection points to the skin of the user by causing compression and a snug fit to the skin to capitalize on the capacitive nature of the human body.

(5) The finished fabric yields a volume resistance in the range of 150 to 175 ohms per foot. Using different combinations of materials, volume resistance in the range of 100 to 300 ohms per foot is also desirable. Surface resistance in the range of 100 to 1000 ohms per foot may also be suitable in some applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. A method of manufacturing a bulk resistive glove, the method comprising:
    twisting a low resistance yarn around at least one yarn with a specific performance property to form a twisted or core-and-sheath-like yarn;
    knitting or weaving the twisted or core-and-sheath-like yarn into the bulk resistive glove;
    wherein the twisted or core-and-sheath-like yarn is distributed throughout the bulk resistive glove and intertwining from a first side of the bulk resistive glove to a second side of the bulk resistive glove such that bioelectricity from skin that comes in contact with the first side of the bulk resistive glove will pass through to the second side of the bulk resistive glove.

2. The method of claim 1 further comprising:
    knitting or weaving at least one other yarn with the twisted or core-and-sheath-like yarn to form the bulk resistive glove that has the twisted or core-and-sheath-like yarn distributed throughout the bulk resistive glove and intertwining from a first side of the bulk resistive glove to a second side of the bulk resistive glove.

3. The method of claim 2 wherein the at least one other yarn is an elastomeric yarn.

4. The method of claim 1 wherein the bulk resistive glove yields a volume resistance in the range of 150 to 175 ohms per foot.

5. The method of claim 1 wherein the bulk resistive glove yields a volume resistance in the range of 100 to 300 ohms per foot.

6. The method of claim 1 wherein the bulk resistive glove yields a volume resistance in the range of 100 to 1,000 ohms per foot.

7. The method of claim 1 wherein the specific performance property of the at least one yarn is thermal resistance.

8. The method of claim 1 wherein the specific performance property of the at least one yarn is moisture management.

9. The method of claim 1 wherein the specific performance property of the at least one yarn is bacterial protection.

10. The method of claim 1 wherein the specific performance property of the at least one yarn is ultraviolet light protection.

11. The method of claim 1 wherein the specific performance property of the at least one yarn is virus protection.

12. The method of claim 1 wherein the specific performance property of the at least one yarn is fire resistance.

13. The method of claim 1 wherein the low resistance yarn is silver nylon.

14. The method of claim 1 wherein the low resistance yarn is selected from the group consisting of silver polyester, silver polypropylene, and silver polyurethane.

15. The method of claim 1 wherein the bulk resistive glove of manufacture is a glove worn by a user and capable of manipulating a capacitive touchscreen device.

16. A glove comprising:
a low resistance yarn;
at least one yarn with a specific performance property, wherein the low resistance yarn is twisted around the at least one yarn forming a twisted or core-and-sheath-like yarn, wherein the twisted or core-and-sheath-like yarn is formed into the glove that has the twisted or core-and-sheath-like yarn distributed throughout the glove and intertwining from a first side of the glove to a second side of the glove;
wherein bioelectricity from skin that comes in contact with the first side of the glove will pass through to the second side of the glove; and
wherein the glove includes at least one of a finger portion, a palm portion, a back of the hand portion, and a wrist cuff.

17. The glove of claim 16 further comprising:
A spun yarn comprising the low resistance yarn, the at least one yarn with a specific performance property, and at least one other yarn.

* * * * *